United States Patent
Alavandi et al.

(10) Patent No.: US 9,434,296 B2
(45) Date of Patent: Sep. 6, 2016

(54) CABLE DEVICE TO RESTRICT HEADLAMP MOTION IN FRONTAL LOW SPEED IMPACTS

(71) Applicant: FORD GLOBAL TECHNOLOGIES, LLC, Dearborn, MI (US)

(72) Inventors: Bhimaraddi Venkaraddi Alavandi, Canton, MI (US); Rajarathinam Jayachandran, Canton, MI (US); Erika Kristin Low, Ann Arbor, MI (US); Matt Alan Niesluchowski, Clarkston, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 230 days.

(21) Appl. No.: 14/166,023

(22) Filed: Jan. 28, 2014

(65) Prior Publication Data

US 2015/0210206 A1    Jul. 30, 2015

(51) Int. Cl.
*B60Q 1/04*     (2006.01)
*B60Q 1/00*     (2006.01)

(52) U.S. Cl.
CPC ........ *B60Q 1/0491* (2013.01); *Y10T 29/49826* (2015.01); *Y10T 29/49947* (2015.01)

(58) Field of Classification Search
CPC .......................... B60Q 1/0408; B60Q 1/0005
See application file for complete search history.

(56) References Cited

FOREIGN PATENT DOCUMENTS

| | | |
|---|---|---|
| DE | 102007035279 | 1/2009 |
| DE | 102012000953 | 9/2012 |
| EP | 1712415 | 10/2006 |
| JP | 2006001345 | 1/2006 |
| KR | 20090062305 | 6/2009 |

OTHER PUBLICATIONS

DYNAmore GmbH, "Advanced Simulation Techniques for Low Speed Vehicle Impacts," Frankenthal (2007).

*Primary Examiner* — Elmito Breval
(74) *Attorney, Agent, or Firm* — Jason Rogers; Price Heneveld LLP

(57) ABSTRACT

A motor vehicle headlamp assembly mounted to a front corner of a motor vehicle between a side fender panel and a front body panel has a front portion and a rear portion, a forward mount attached to a front structure of the motor vehicle, and a rearward mount attached to a rear structure of the motor vehicle situated rearward of the front structure. An anchor cable has a first end attached to the rear portion of the headlamp assembly and a second end attached to the motor vehicle proximate the rear structure, whereby the rear portion of the headlamp assembly is substantially restrained from rearward, upward, and outward movement during a low velocity impact event.

20 Claims, 6 Drawing Sheets

CABLE DEVICE TO RESTRICT HEADLAMP MOTION IN FRONTAL LOW SPEED IMPACTS

FIELD OF THE INVENTION

The present invention generally relates to the mitigation of fender and body damage in the event of a frontal low speed impact, specifically the installation and use of an anchor cable attached to a rear portion of the headlamp assembly to restrict motion of the headlamp assembly and eliminate or reduce the interaction of the headlamp assembly with surrounding components.

BACKGROUND OF THE INVENTION

Headlamp assemblies for motor vehicles are very well-known in the art of automotive design. In virtually all motor vehicles, one of a pair of headlamp assemblies is mounted on either side of and forward on the motor vehicle to provide illumination of the roadway ahead and visibility of the motor vehicle to others. However, such placement of the headlamp assembly often places the headlamp assembly at risk of damage during impact events involving the frontal portions of the motor vehicle.

Further, insurance ratings for a specific vehicle, especially in Europe, are based on the extent of damage, the ease of repair of any damaged parts, and the overall repair cost of a motor vehicle having been involved in a low speed impact event. One such low speed impact event to be considered in designing modern motor vehicles is an impact with a rigid barrier at 15 kph, where the rigid barrier is angled at 10° and offset 10% from the centerline of the vehicle with 40% overlap with the vehicle. In this impact mode, it is desirable to mitigate and minimize damage to the integrated front vehicular structures and systems, such as the front rail, side fender panels, cooling system, grill opening reinforcement structure, and shotgun, as well as maintain the gap between side fender and front occupant door panels. Repair of these parts involves expensive procedures and hence results in unfavorable insurance ratings, which may negatively impact customers' purchasing decisions and overall experience with their chosen motor vehicle.

As a consequence of this low speed offset impact event, it is therefore desirable to contain damage to only the front fascia, front bumper system assembly, front hood, grill assembly, and headlamp assembly, all of which may be relatively easily unbolted from the main vehicle body and replaced after minor repairs to the vehicle itself. The headlamp assembly, typically manufactured from polycarbonate plastic and/or polypropylene materials, is located in the crush zone. In at least one common motor vehicle design, the headlamp is attached at its front portion to the fender or other vehicle structure, such as the grill opening reinforcement structure, and at its rear portion to the shotgun. Thus, the headlamp assembly often interacts with the fender and shotgun.

Ideally, the headlamp assembly merely deforms and fractures in such low speed impacts. However, it has been found that undesirable headlamp interaction increases if the headlamp assembly is longer and is oriented further toward the side of the vehicle, as is the case with emerging styling trends in the automotive industry. That is, the rear portion of such headlamp assembly designs tends to move rearward, upward, and outward during low speed impact events. In order to minimize damage to adjacent components, past practice has resulted in the design of the attachment points and methods of the headlamp assembly to the motor vehicle to intentional "break" or otherwise separate in order to prevent higher compressive loads from being transferred to the side fender panel and shotgun, thus avoiding damage to the same. Yet, due to the geometry of the longer headlamp assemblies mounted further to the side of the vehicle, increased interaction of the headlamp assembly with the side fender panel and shotgun becomes inevitable in the low speed offset impact event. This enhanced interaction can damage the side fender panel and shotgun. Furthermore, enhanced rearward motion of the fender, due to loading from the headlamp, can result in rearward displacement of the side fender panel and closing the gap between the side fender panel and the front occupant door panel and interfere with the operation and opening of the occupant door. Hence, a headlamp assembly design which overcomes these drawbacks would be advantageous.

The headlamp assembly disclosed herein particularly accomplishes the foregoing by adapting the present typical motor vehicle headlamp assembly described above by attaching a first top end of an anchor cable to a rear portion of the headlamp assembly and attaching a second lower end of the same to the nearest possible location on the vehicle body structure. This anchor cable attachment restricts the motion of the rear portion of the headlamp assembly in all three directions (rearward, upward, and outward). The restricted motion of the headlamp assembly eliminates or greatly reduces the interaction of headlamp with the surrounding components, such as the side fender panel and shotgun. This helps eliminate the damage to adjacent components and restrict rearward motion of the side fender panel, which in turn minimizes gap closure between the side fender panel and the front occupant door panel.

Thus, the solution presented by the present disclosure is a relatively low-cost, add-on anchor cable that reduces damage by restricting the rearward, upward, and outward displacement of a rear portion of the headlamp assembly and, in turn, rearward displacement of the side fender panel. The solution thus reduces the interaction of the headlamp assembly with the surrounding components during impact events.

SUMMARY OF THE INVENTION

According to one aspect of the present disclosure, a motor vehicle headlamp assembly is mounted to a front corner of a motor vehicle between a side fender panel and a front body panel. The headlamp assembly has a front portion and a rear portion, a forward mount attached to a front structure of the motor vehicle, and a rearward mount attached to a rear structure of the motor vehicle situated rearward of the front structure. An anchor cable has a first end attached to the rear portion of the headlamp assembly and a second end attached to the motor vehicle proximate the rear structure, whereby the rear portion of the headlamp assembly is substantially restrained from rearward, upward, and outward movement during an offset frontal impact event at a velocity of 15 kph or less.

Another aspect of the disclosure is a motor vehicle headlamp assembly where the first end of the anchor cable is attached to the headlamp assembly proximate the rearward mount.

Still another aspect of the present disclosure is a motor vehicle headlamp assembly where the second end of the anchor cable is mounted to the rear structure.

Yet another aspect of the present disclosure is a motor vehicle headlamp assembly wherein the rear structure is a shotgun to which a motor vehicle shock strut is attached.

An additional aspect of the present disclosure is a motor vehicle headlamp assembly wherein a weld nut is attached to the shotgun and the second end of the anchor cable has an integral loop and is secured to the weld nut by a fastener extending within the loop.

Another aspect of the present disclosure is a motor vehicle headlamp assembly wherein the cable has no more than 5 mm of slack when installed.

Still another aspect of the present disclosure is a motor vehicle headlamp assembly wherein the anchor cable is fabricated from steel, aluminum, or nylon.

A further aspect of the present disclosure is a motor vehicle headlamp assembly wherein the headlamp assembly has a hook disposed proximate the rearward mount upon which a loop on the first end of the anchor cable is received.

Yet a further aspect of the present disclosure is a motor vehicle headlamp assembly wherein the headlamp assembly has a notch within which an enlarged portion of the first end of the anchor cable is received.

An additional aspect of the present disclosure is a motor vehicle headlamp assembly wherein the first end of the anchor cable is attached to the headlamp assembly by a fastener.

Yet another aspect of the present disclosure is a motor vehicle headlamp assembly comprising a forward mount attached to a front structure of the motor vehicle, a rearward mount attached to a rear structure of the motor vehicle situated rearward of the front structure, and an anchor cable having a first end attached to the headlamp assembly and a second end attached to the motor vehicle proximate the rear structure.

A still further aspect of the present disclosure is a motor vehicle headlamp assembly wherein the rear portion of the headlamp assembly is substantially restrained by the anchor cable from rearward, upward, and outward movement during a low velocity impact event.

Another aspect of the present disclosure is a motor vehicle headlamp assembly wherein the headlamp assembly is mounted to a front corner of the motor vehicle between a side fender panel and a front body panel and the anchor cable substantially restrains motion of the headlamp assembly toward the side fender panel.

A yet additional aspect of the present disclosure is a method for substantially restrained motion of a headlamp assembly having a front portion and rear portion from rearward, upward, and outward movement during a low velocity impact event, the method comprising the steps of mounting a forward mount of the front portion of the headlamp assembly to a front structure of the motor vehicle, mounting a rearward mount of the rear portion of the headlamp assembly to a rear structure of the motor vehicle situated rearward of the front structure, and extending an anchor cable from the rear portion of the headlamp assembly to the motor vehicle, the anchor cable having a first end attached to the rear portion of the headlamp assembly and a second end attached to the motor vehicle proximate the rear structure.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
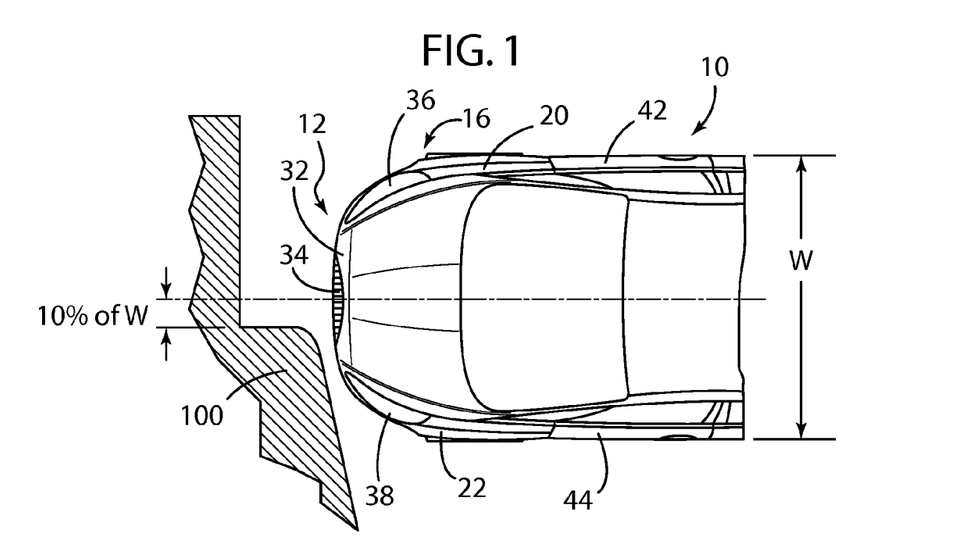
FIG. 1 is a top plan view of a motor vehicle prior to a low speed impact event.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A contemporary motor vehicle 10 typically includes a front end 12 at which an engine compartment 14 is disposed. As is usual, the motor vehicle 10 is designed to present a deformable forward section 16 extending generally forward of the motor vehicle 10, which includes relatively integral structures and systems, such as the engine compartment 14 and components mounted therein, front rail assembly 18, side fender panels 20, 22, cooling system 24, grill opening reinforcement structure 26, carrier structure 27, and shotgun 28. The repair and replacement of these structures and systems is often quite difficult and expensive. For example, the side shotgun structure 28 is formed by stamping, typically fabricated from a steel alloy, a section pointing toward the front side in the engine compartment 14 proximate the front wheels and are typically attached to the motor vehicle 10 by welded joints. These joints must be cut out and re-welded in place to effect repairs.

Other structures, such as the front hood 30, front fascia 40, bumper system assembly 32, grill assembly 34, and headlamp assemblies 36, 38, are far more readily replaced. The front hood 30 is typically connected to the body of the motor vehicle 10 by hinges (not shown), attached with removable fasteners, in order to raise the front hood 30 from a closed to an open position. The front fascia 40 is typically a polymeric shell that is formed to receive and conceal the internal components of the bumper system assembly 32 that are attached to the front end 12 of the motor vehicle 10, which together serve to protect the motor vehicle 10 from ultra-low speed impacts (i.e., about 8.5 kmh). The front fascia 40 and bumper system assembly 32 are also typically attached to the motor vehicle by removable fasteners. The grill assembly 34 and headlamp assemblies 36, 38, also attached to the motor vehicle by removable fasteners, are typically polymeric components that integrate with the hood 30, side fender panels 20, 22, front fascia 40, and bumper system assembly 32 to form an aerodynamic and aesthetically pleasing vehicular form, as has been the trend in recent years. In the event of a frontal impact event, such as the 56 kph impact specified in the New Car Assessment Program (NCAP) conducted by the National Highway Traffic Safety Commission of the U.S. Department of Transportation, it is contemplated that the deformable forward section 16 will deform upon impact with an object or barrier in a collision event to absorb the impact energy associated with the collision and thereby reduce the risk and severity of injury to the motor vehicle occupants.

Figure 2:
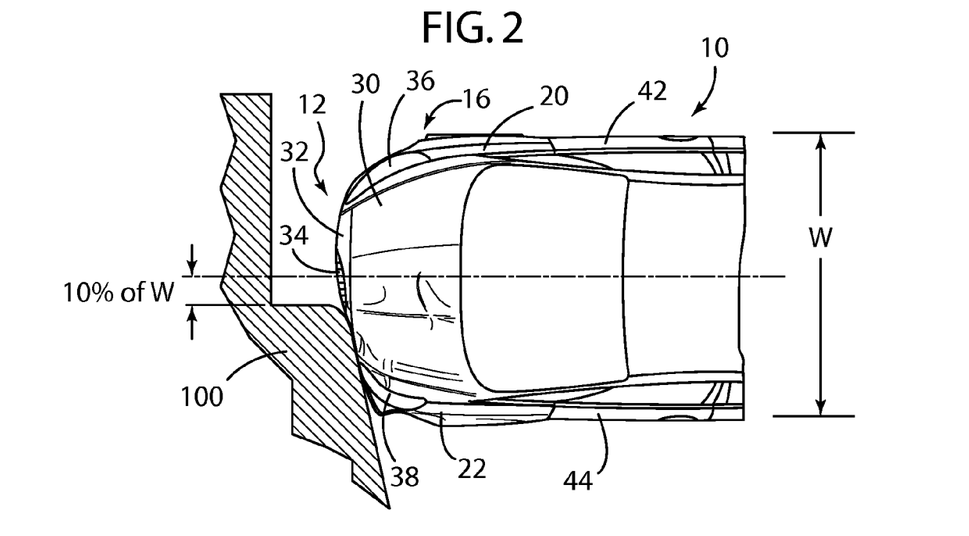
FIG. 2 is a top plan view of a motor vehicle subsequent to a low speed impact event at 15 kph, where the rigid barrier is angled at 10° and offset 10% from the centerline of the vehicle with 40% overlap with the vehicle.

However, in the case of relatively low speed impacts (e.g., 15 kph), which offer significantly lower risk of injury to the motor vehicle occupants, it is desirable that deformation and damage to the deformable forward section 16 be minimized. As noted above, insurance companies provide ratings for specific vehicles which are based, at least in part, on the extent of damage, ease of repair of damaged parts, and repair cost of a vehicle in such low speed impact events. One such low speed impact event is an impact of the motor vehicle with a rigid barrier 100 at 15 kph, where the rigid barrier 100 is angled at 10° relative the lateral plane of the motor vehicle and offset 10% from the motor vehicle 10 centerline, with a 40% overlap with the motor vehicle 10, as shown in FIGS. 1 and 2. In this impact mode, damage to the side fender panels 20, 22, forward-mounted interior functional systems, such as the cooling system 24, and interior structures, such as the front rail assembly 18 that supports the vehicle engine, and the shotgun 28 that supports a shock tower, which, in turn, retains the front shock strut (not shown), is especially undesirable. Repair of these parts and components involves expensive procedures and hence results in unfavorable insurance ratings, which may negatively influence the customers' purchasing decisions and overall vehicle experience. Hence, it is desirable to limit the damage, if any, from such offset impacts to only the front hood 30, front fascia 40, bumper system assembly 32, grill assembly 34, and headlamp assemblies 36, 38, each of which with relative ease may be unbolted from the main vehicle body and replaced after appropriate repairs.

An additional damage criterion includes reduction of the gap between the side fender panels 20, 22 and front occupant door panels 42, 44 caused by rearward displacement of the side fender panels 20, 22 relative the front occupant door panels 42, 44 during the impact event, which if severe can result in causing the side fender panels 20, 22 to interfere with the operation and opening of the front occupant door panels 42, 44. Often, this rearward displacement of the side fender panels 20, 22 is caused by the rearward, upward, and outward displacement of the headlamp assemblies 36, 38.

Figures 3, 4:
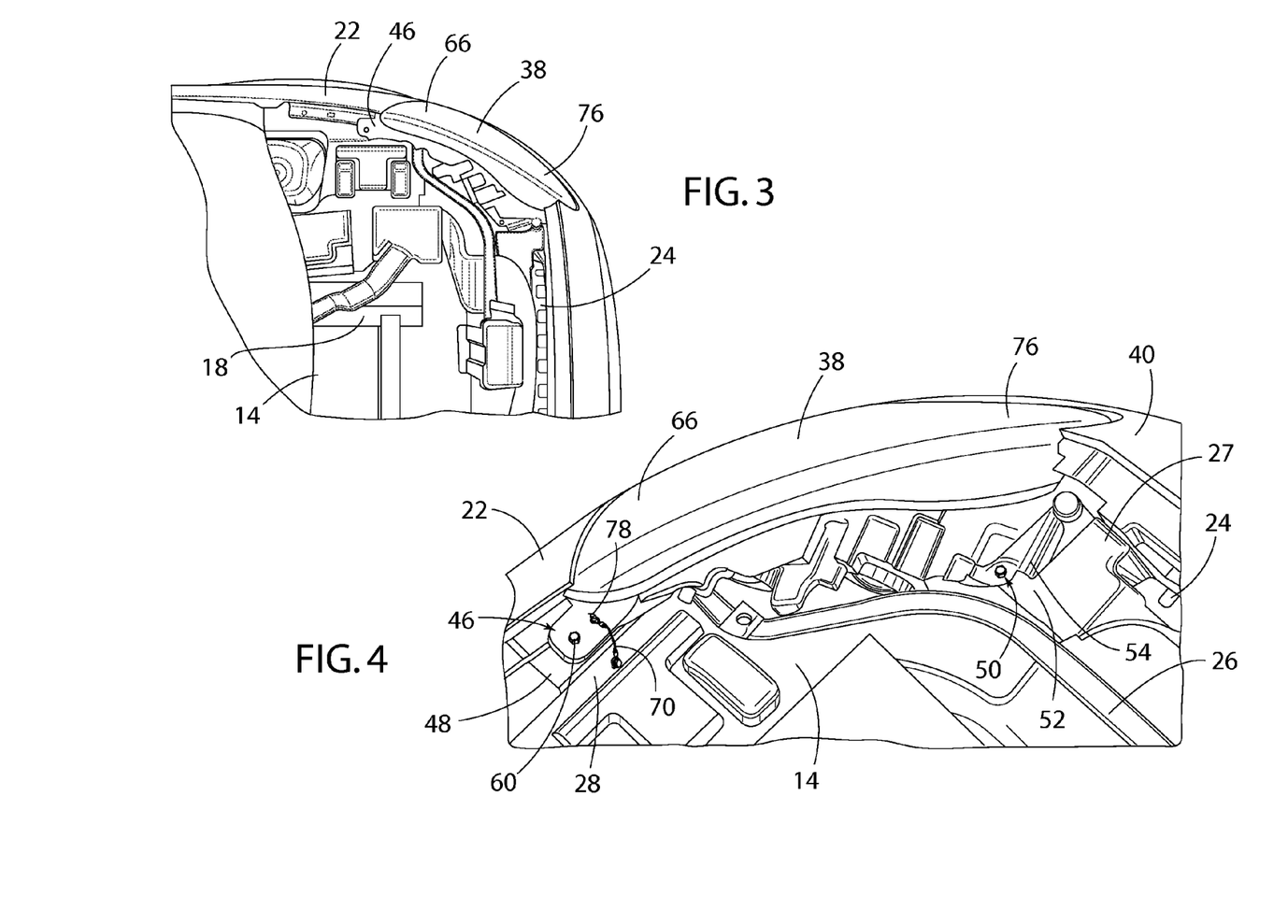
FIG. 3 is a side perspective view of the front end corner of a typical motor vehicle with the front hood raised.
FIG. 4 is a side perspective view of the front end of a typical motor vehicle with the front hood raised, the motor vehicle having an elongated headlamp assembly mounted on the side of the vehicle.

As shown in FIGS. 3 and 4, the headlamp assembly 38 (typically fabricated from polycarbonate and/or polypropylene) is situated well within the crush zone for the aforementioned low speed offset impact event. The rear attachment 46 of the headlamp assembly 38 is usually located on an upper portion 48 on the shotgun 28 and the front attachment 50 may be located on the upper front carrier reinforcement 52, each of the rear attachment 46 and the front attachment 50 comprising a mounting tab 54, 56 extending from the headlamp assembly 38, the mounting tabs 54, 56 having an opening 58 through which a threaded fastener 60 can be inserted and subsequently threaded into a weld nut (not shown) or tapped hole (not shown) in the shotgun 28 or upper front rail 52, respectively. Normally, the headlamp assembly 38 deforms and cracks during low speed impacts, as shown in FIG. 2. Also, the mounting tabs 54, 56 at the rear attachment 46 and/or front attachment 50 of the headlamp assembly 38 can be designed to fracture at a predetermined load to separate the mounting tabs 54, 56 of the headlamp assemblies 36, 38 from their respective underlying structures to prevent excessive compressive loads from being transferred to either the side fender panel 22 or shotgun 28 to avoid damage to the same.

However, headlamp assembly 38 interaction with the side fender panel 22 and/or shotgun 28 increases as the headlamp assembly 38 is elongated and is further oriented to the side of the motor vehicle 10, as is the case with emerging styling trends in the auto industry. FIGS. 3 and 4 show a portion of the front end 12 of a typical motor vehicle 10, with the front hood 30 in the raised position. Due to the geometrical nature of the mounting location of the current trend in headlamp assemblies 36, 38, increased interaction with the side fender panels 20, 22 and shotgun 28 becomes inevitable in this impact mode. During low speed impacts and, in particular, the offset frontal impact mode described above, the rear portion 66 of the headlamp assembly 38 tends to move rearward, upward, and outward. This enhanced interaction tends to damage the side fender panel 22 and shotgun 28. Furthermore, enhanced rearward displacement of the side fender panel 22, due to rearward compression loading from the headlamp assembly 38, can result in closure of the gap between the side fender panel 22 and the front occupant door panel 44, which is undesirable.

Thus, in spite of the headlamp assembly 38 mounting tab 56 attachment at the upper portion 48 of the shotgun 28 being designed to fracture under load, undesirable damage to the motor vehicle 10 thus still causes kinks in the side fender panel 22, unreasonably high tensile deformation of the upper portion 48 of the shotgun 28, to which the headlamp assembly 38 is attached, and an undesirable gap closure between the side fender panel 22 and front occupant door panel 44. Damage to these three areas is considered especially undesirable since the shotgun 28 is essentially integrated with the body of the motor vehicle 10 and is difficult and expensive to replace.

The headlamp assembly 38 disclosed herein particularly avoids the foregoing interactions by adapting the present typical motor vehicle headlamp assembly 38 described above and attaching thereto a first top end 68 of an anchor cable 70 to the rear portion 66 of the headlamp assembly 38 and a second lower end 72 of the anchor cable 70 to the nearest possible rigid structural member, such as a lower portion 74 of the shotgun 28, as shown in FIGS. 5-8. The anchor cable 70 so attached restricts the motion of the rear portion 66 of the headlamp assembly 38 in all three directions (rearward, upward, and outward). Restricted from motion, the rear portion 66 of the headlamp assembly 38 is thus unable to interact with the side fender panel 22, eliminating or greatly reducing the interaction of the headlamp assembly 38 with and damage to the side fender panel 22, particularly closure of the gap between the side fender panel 22 and front occupant door panel 44. Motion of the forward portion 76 of the headlamp assembly 38 thus becomes irrelevant.

Figure 5:
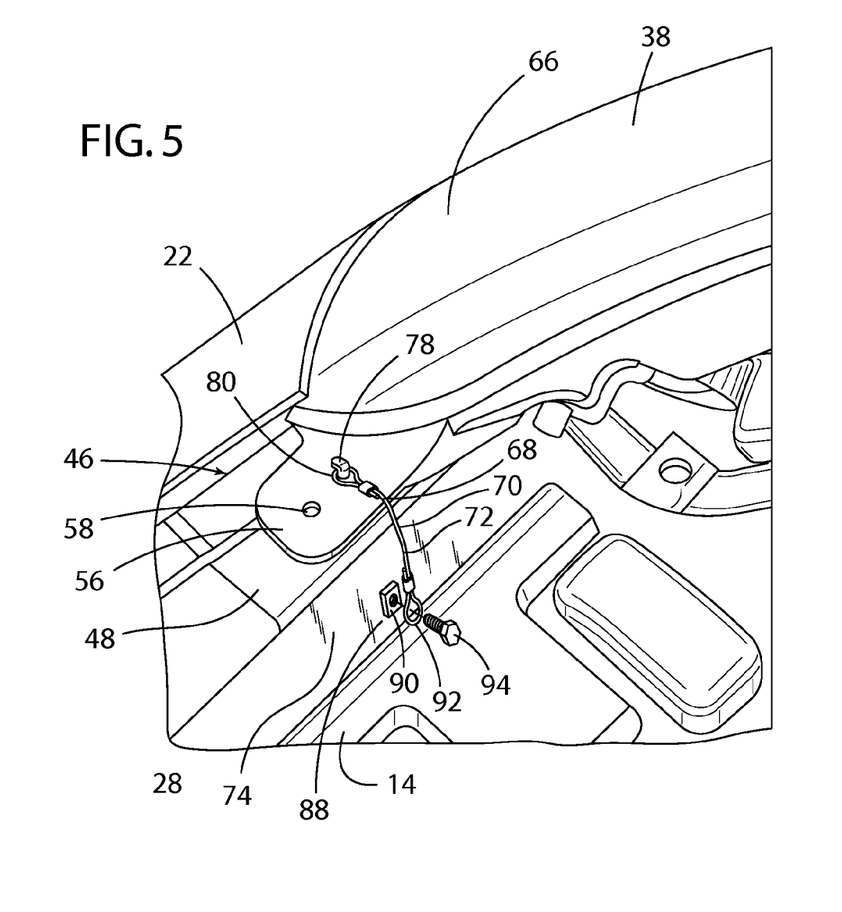
FIG. 5 is a side perspective view of the front end of a typical motor vehicle with the front hood raised, the motor vehicle having an elongated headlamp assembly mounted on the side of the vehicle attached at its rear by a first embodiment of the anchor cable of the present disclosure.
Figure 6:
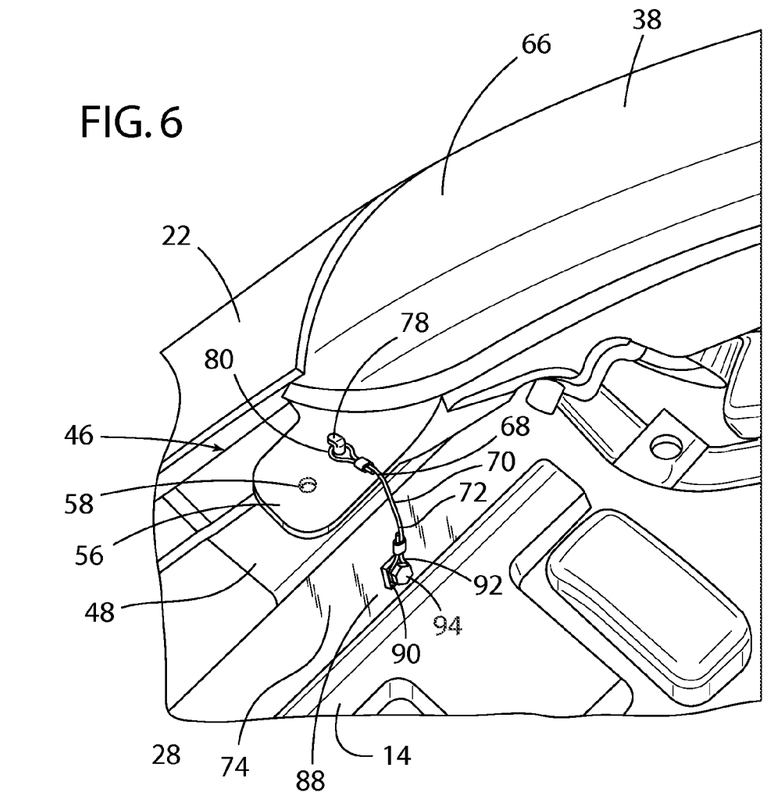
FIG. 6 is another side perspective view of the front end of a typical motor vehicle with the front hood raised, the motor vehicle having an elongated headlamp assembly mounted on the side of the vehicle attached at its rear by the first embodiment of the anchor cable of the present disclosure.
Figure 7:
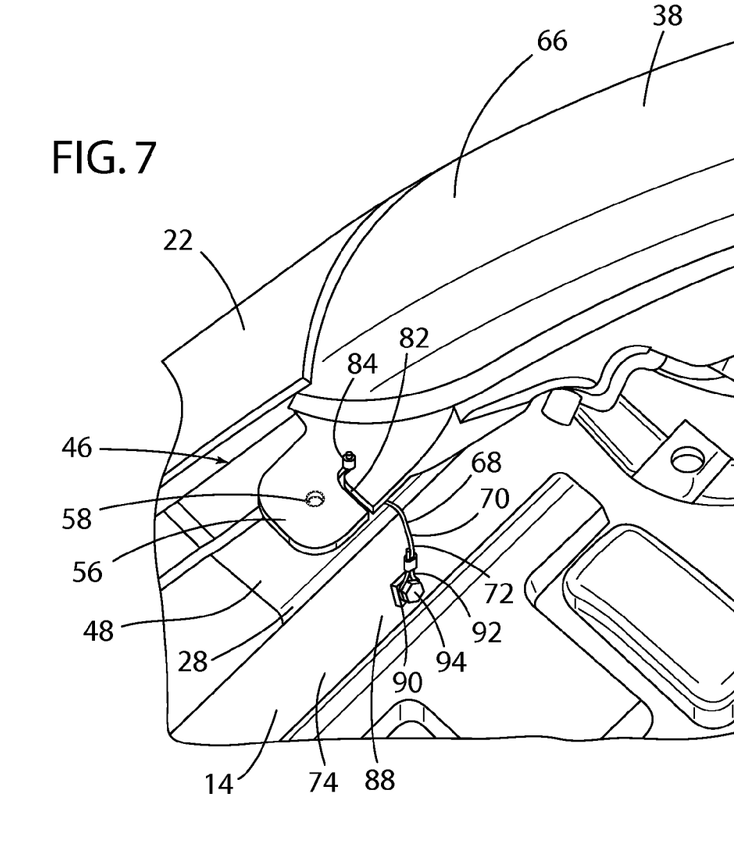
FIG. 7 is a further side perspective view of the front end of a typical motor vehicle with the front hood raised, the motor vehicle having an elongated headlamp assembly mounted on the side of the vehicle attached at its rear by a second embodiment of the anchor cable of the present disclosure.
Figure 8:
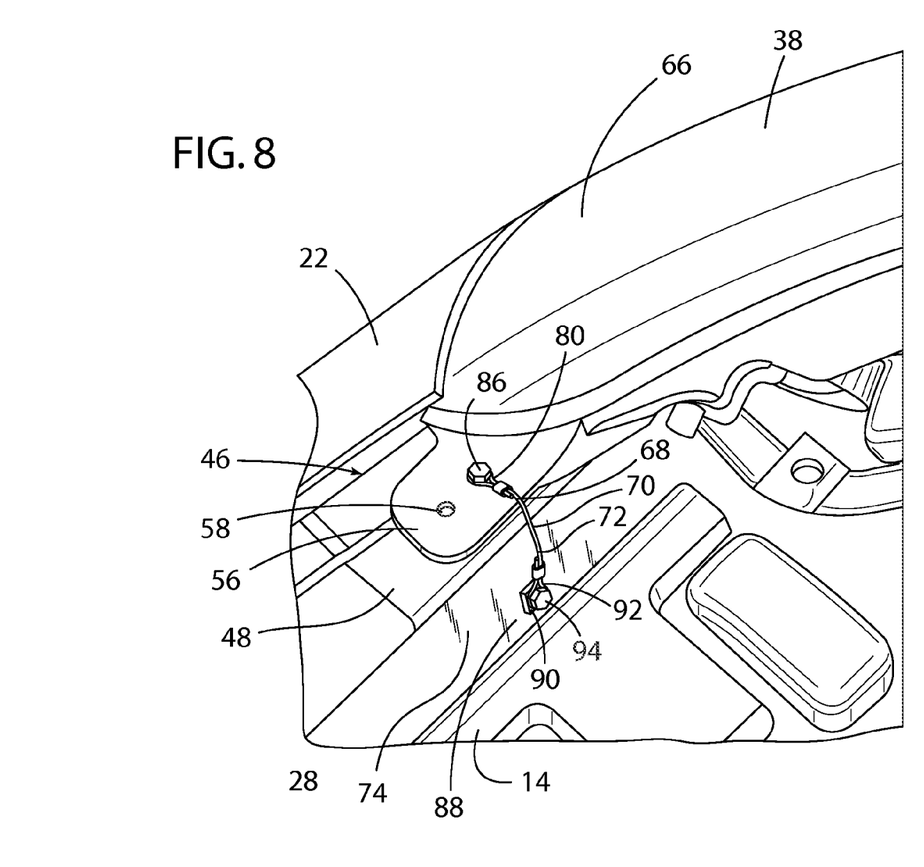
FIG. 8 is yet another side perspective view of the front end of a typical motor vehicle with the front hood raised, the motor vehicle having an elongated headlamp assembly mounted on the side of the vehicle attached at its rear by a third embodiment of the anchor cable of the present disclosure.

The anchor cable 70 is preferably fabricated from a material capable of reliably bearing a tensile load of at least 3 kN, such as steel, aluminum, nylon, or other suitable material. The first top end 68 of the anchor cable 70 may be readily attached to the rear portion 66 of the headlamp assembly 38, which can be accomplished in several ways. As shown in FIGS. 5 and 6, the headlamp assembly 38 may be preferably provided with a hook 78 disposed proximate the rear attachment 46 upon which a loop 80 on the first top end 68 of the anchor cable 70 is received. Alternatively, the headlamp assembly 38 can be provided with a notch 82 within which an enlarged portion 84 of the first top end 68 of the anchor cable 70 is received, as shown in FIG. 7. Finally, FIG. 8 depicts the first top end 68 of the anchor cable 70 attached to the headlamp assembly 38 by a fastener 86 through loop 80.

The second lower end 72 of the anchor cable 70 is preferably secured to the closest rigid structure proximate the rear portion 66 of the headlamp assembly 38, as shown in FIGS. 5-8. In the preferred embodiment, the closest rigid structure proximate the rearward portion 66 of the headlamp assembly 38 is the lower surface 88 of the shotgun 28. A weld nut 90 is attached to the shotgun 28, wherein the lower second end 72 of the anchor cable 70 has an integral loop 92 and is secured to the weld nut 90 by a fastener 94 extending within the integral loop 92. Preferably, the anchor cable 70 for the motor vehicle headlamp assembly 38 has no more than 5 mm of slack when installed. This slack in the anchor cable 70 is provided to facilitate its attachment to the headlamp assembly 38.

As noted above, the headlamp assembly 38 will be preferentially provided with a hook 78 to receive the loop 80 on the top first end 68 of the anchor cable 70. After an impact, the damaged headlamp assembly 38 can be easily removed by un-hooking the first end 68 of the anchor cable 70 from the hook 78 on the headlamp assembly 38, and the new headlamp assembly 38 can be hooked back to the first end 68 of the anchor cable 70.

Vehicular scaled finite element studies of the front end 12 without and with the anchor cable 70 were conducted to assess and compare the resulting damage in the simulated low speed offset frontal impact mode as described above. Comparing the results, it is predicted that damage to the side fender panel 22 and the shotgun 28 and closure of the gap between the side fender panel 22 and front occupant door panel 44 will be mitigated. That is, in the simulation, the rear attachment 46 of the headlamp assembly 38 did not break with the addition of the anchor cable 70 and remained in place. That is, contrary to earlier design dogma, the anchor cable 70 in the simulation succeeded in restricting at least the rear portion 66 of the headlamp assembly 38 from upward, rearward, and outward motion. While this restriction of the motion resulted in enhanced predicted deformation of the headlamp assembly 38, the predicted restriction of motion and deformation of the rear portion 66 of the headlamp assembly 38 avoided predicted load transfer of and interaction of headlamp assembly 38 with the shotgun 28 and side fender panels 20, 22. As a result, damage to the side fender panels 20, 22 and the gap closure between the side fender panels 20, 22 and front occupant door panels 42, 44 is predicted to be reduced and improved.

Thus, the addition of the anchor cable 70 not only is predicted to reduce damage to the side fender panels 20, 22 and upper shotgun 48, but also is predicted to reduce the rearward motion of the side fender panels 20, 22 and preserve the gap between the side fender panels 20, 22 and front occupant door panels 42, 44 after a low speed impact. As a result, the essentially fixed components surrounding the headlamp assemblies 36, 38, such as the side fender panels 20, 22 and shotgun 28, should remain undamaged in low speed frontal impact events. The remaining components, such as the front hood 30, front fascia 40, bumper system assembly 32, grill assembly 34, and headlamp assemblies 36, 38, all of which may be readily unbolted and replaced, will be essentially sacrificed.

An additional advantage of the anchor cable 70 disclosed herein is that it can be retrofitted to existing headlamp assemblies 36, 38. That is, with relatively little redesign effort, the benefits of the present disclosure can be realized. Also, a further advantage of the anchor cable 70 disclosed herein is that it requires a minimum packaging volume. Further, a highly desirable feature of the anchor cable 70 disclosed is that it is readily tunable to adjust the force levels as required for applications across various vehicle to vehicle structures. Finally, after the impact event, the headlamp assemblies 36, 38 and the anchor cable 70 can simply be replaced.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A motor vehicle headlamp assembly mounted to a front corner of a motor vehicle between a side fender panel and a front body panel, the headlamp assembly having a front portion and a rear portion, the headlamp assembly further comprising:
    a forward mount attached to a front structure of the motor vehicle;
    a rearward mount attached to a rear structure of the motor vehicle situated rearward of the front structure; and
    an anchor cable having a first end attached to the rear portion of the headlamp assembly and a second end attached to the motor vehicle proximate the rear structure, whereby the rear portion of the headlamp assembly is substantially restrained from rearward, upward, and outward movement during an offset frontal impact event at a velocity of 15 kph or less.

2. The motor vehicle headlamp assembly of claim 1, wherein the first end of the anchor cable is attached to the headlamp assembly proximate the rearward mount.

3. The motor vehicle headlamp assembly of claim 1, wherein the second end of the anchor cable is mounted to the rear structure.

4. The motor vehicle headlamp assembly of claim 3, wherein the rear structure is a shotgun to which a motor vehicle shock strut is attached.

5. The motor vehicle headlamp assembly of claim 4, wherein a weld nut is attached to the shotgun and the second end of the anchor cable has an integral loop and is secured to the weld nut by a fastener extending within the loop.

6. The motor vehicle headlamp assembly of claim 5, wherein the cable has no more than 5 mm of slack when installed.

7. The motor vehicle headlamp assembly of claim 1, wherein the anchor cable is fabricated from steel, aluminum, or nylon.

8. The motor vehicle headlamp assembly of claim 1, wherein the headlamp assembly has a hook disposed proximate the rearward mount upon which a loop on the first end of the anchor cable is received.

9. The motor vehicle headlamp assembly of claim 1, wherein the headlamp assembly has a notch within which an enlarged portion of the first end of the anchor cable is received.

10. The motor vehicle headlamp assembly of claim 1, wherein the first end of the anchor cable is attached to the headlamp assembly by a fastener.

11. A headlamp assembly for a motor vehicle comprising a forward mount attached to a front structure of the motor vehicle, a rearward mount attached to a rear structure of the motor vehicle situated rearward of the front structure, and an anchor cable having a first end attached to the headlamp assembly and a second end attached to the motor vehicle proximate the rear structure, whereby the rearward mount of the headlamp assembly is substantially restrained from rearward, upward, and outward movement during an offset frontal impact event.

12. The motor vehicle headlamp assembly of claim 11, wherein a rear portion of the headlamp assembly is substantially restrained by the anchor cable from rearward, upward, and outward movement during an impact event of up to and including 15 kph.

13. The motor vehicle headlamp assembly of claim 12, wherein the headlamp assembly is mounted to a front corner of a motor vehicle between a side fender panel and a front body panel, and the anchor cable substantially restrains motion of the headlamp assembly toward the side fender panel.

14. The motor vehicle headlamp assembly of claim 11, wherein the first end of the anchor cable is attached to the headlamp assembly proximate the rearward mount.

15. The motor vehicle headlamp assembly of claim 11, wherein the second end of the anchor cable is mounted to the rear structure.

16. A method for substantially restraining motion of a headlamp assembly for a motor vehicle, the headlamp assembly having a front portion and rear portion substantially restrained from rearward, upward, and outward movement during a low velocity impact event, the method comprising the steps of:
    mounting a forward mount of the front portion of the headlamp assembly to a front structure of the motor vehicle;
    mounting a rearward mount of the rear portion of the headlamp assembly to a rear structure of the motor vehicle situated rearward of the front structure; and
    extending an anchor cable from the rear portion of the headlamp assembly to the motor vehicle, the anchor cable having a first end attached to the rear portion of the headlamp assembly and a second end attached to the motor vehicle proximate the rear structure.

17. The method of claim 16, wherein a weld nut is attached to the rear structure, wherein the second end of the anchor cable has an integral loop and is secured to the weld nut by a fastener extending within the loop.

18. The method of claim 16, further comprising the step of providing a notch on the headlamp assembly within which an enlarged portion of the first end of the anchor cable is received.

19. The method of claim 16, further comprising the step of attaching the first end of the anchor cable to the headlamp assembly by a fastener.

20. The method of claim 16, further comprising the step of providing a hook disposed proximate the rearward mount upon which a loop on the first end of the anchor cable is received.

* * * * *